(12) United States Patent
Byers et al.

(10) Patent No.: US 8,868,818 B2
(45) Date of Patent: Oct. 21, 2014

(54) METHOD FOR ASSOCIATING PHYSICAL ADDRESS WITH LOGICAL COMMUNICATION ADDRESS IN A MEDIA LIBRARY ASSEMBLY

(75) Inventors: Daniel J. Byers, Parker, CO (US); Don Doerner, San Jose, CA (US); Michael Jones, Englewood, CO (US); Sanam Mittal, Parker, CO (US); Jeff Szmyd, Highland Ranch, CO (US)

(73) Assignee: Quantum Corporation, San Jose, CA (US)

( * ) Notice: Subject to any disclaimer, the term of this patent is extended or adjusted under 35 U.S.C. 154(b) by 751 days.

(21) Appl. No.: 12/397,252

(22) Filed: Mar. 3, 2009

(65) Prior Publication Data
US 2010/0228946 A1 Sep. 9, 2010

(51) Int. Cl.
*G06F 13/00* (2006.01)
*H04L 12/46* (2006.01)
(52) U.S. Cl.
CPC .................................. *H04L 12/462* (2013.01)
USPC ................. 711/4; 711/E12.019; 711/E12.025
(58) Field of Classification Search
USPC .................................................. 711/154, 202
See application file for complete search history.

(56) References Cited

U.S. PATENT DOCUMENTS

| | | | |
|---|---|---|---|
| 6,728,718 B2* | 4/2004 | Banerjee et al. ....................... 1/1 |
| 8,014,387 B2* | 9/2011 | Arimilli et al. ............... 370/353 |
| 2001/0038636 A1* | 11/2001 | Nanduri et al. ............... 370/419 |
| 2002/0144048 A1* | 10/2002 | Bolt .................................. 711/4 |
| 2003/0133450 A1* | 7/2003 | Baum .......................... 370/389 |
| 2004/0128427 A1* | 7/2004 | Kazar et al. ....................... 711/4 |
| 2004/0260861 A1* | 12/2004 | Serizawa et al. ................... 711/4 |
| 2006/0174036 A1* | 8/2006 | Dain et al. ..................... 709/245 |
| 2007/0180109 A1* | 8/2007 | Brim .............................. 709/225 |
| 2007/0223494 A1* | 9/2007 | Hyyrynen et al. ....... 370/395.54 |
| 2007/0233886 A1* | 10/2007 | Fan ................................ 709/230 |
| 2008/0219273 A1* | 9/2008 | Kaneko ......................... 370/401 |
| 2009/0006650 A1* | 1/2009 | Saito ............................. 709/245 |
| 2009/0129290 A1* | 5/2009 | Seo et al. ....................... 370/254 |
| 2009/0172151 A1* | 7/2009 | Davis ............................ 709/224 |
| 2011/0185089 A1* | 7/2011 | El Zur et al. .................... 710/52 |

OTHER PUBLICATIONS http://www.tech-faq.com/dhcp-leasing.html.*
CAM Table, Wikipedia, http://en.wikipedia.org/wiki/CAM_Table.*

* cited by examiner

*Primary Examiner* — Sean D Rossiter
(74) *Attorney, Agent, or Firm* — Roeder & Broder LLP; James P. Broder

(57) ABSTRACT

A method for associating a physical address with a logical communication address for an Ethernet-connected media drive (22A1-22A4, 22B1-22B4) in a media library assembly (10) includes the steps of providing a first media drive (22A1) having a first physical address; sending a request for a first logical communication address from the first media drive (22A1) to a library controller (16) via an Ethernet switch (18) the first physical address being imbedded in the request; and recording the first physical address with the Ethernet switch (18). The method can include associating the first physical address with one of a plurality of Ethernet switch ports (26A1-26A4, 26B1-26B4) using a mapping server (25) of the library controller (16). The method can include searching a routing table (228) of the Ethernet switch (18) with the library controller (16) to determine the first physical address. The method can also include assigning the first logical communication address to the first physical address with the library controller (16). The step of assigning can include basing the first logical communication address on an Ethernet switch port (26A1-26A4, 26B1-26B4) that is associated with the first physical address.

22 Claims, 3 Drawing Sheets

| Switch Port No. | PHYSICAL ADDRESS |
|---|---|
| 26A1 | 00-B0-D0-E4-77-D1 |
| 26A2 | |
| 26A3 | |
| 26A4 | |
| 26B1 | |
| 26B2 | |
| 26B3 | |
| 26B4 | |
Fig. 2A
| Switch Port No. | PHYSICAL ADDRESS |
|---|---|
| 26A1 | 00-B0-D0-E4-77-D1 |
| 26A2 | 00-B0-D0-F4-87-E1 |
| 26A3 | 00-B0-D0-E5-64-70 |
| 26A4 | 00-B0-D0-66-55-01 |
| 26B1 | 00-B0-D0-69-77-20 |
| 26B2 | 00-B0-D0-71-73-D3 |
| 26B3 | 00-B0-D0-83-21-41 |
| 26B4 | 00-B0-D0-82-22-42 |
Fig. 2B

METHOD FOR ASSOCIATING PHYSICAL ADDRESS WITH LOGICAL COMMUNICATION ADDRESS IN A MEDIA LIBRARY ASSEMBLY

BACKGROUND

Storage media suitable for storing vast amounts of information content include streaming tape cartridges. Streaming tape drives are used to transfer multiple blocks of user data to and from the tape cartridges in a single streaming operation, rather than as a series of start-stop operations. Streaming tape is particularly well suited for backup operations as well as for providing archival and retrieval operations for vast quantities of information.

For even greater storage capacity, a plurality of tape drives and multiple tape cartridges can be positioned within a tape library. In these types of tape libraries, a library controller needs to be able to distinguish between the various tape drives within the library. Typically, this can be accomplished by associating a physical address of the tape drive with a logical address of the tape drive. A tape drive controller, separate from the tape drive itself, used in conjunction with a physical address, defined externally from the tape drive, has been used in conventional systems. In this type of system, the tape drive controller would read a dip switch or a geographical address representing the physical location of the tape drive.

In the past, the tape library system controller of certain systems would use a predefined map between the logical communication address and the physical location address. When the tape library system controller received a message from a tape drive with a certain logical communication address, the tape library system controller associated the tape drive to its location in the tape library using the predefined map.

However, in a tape library (or another type of media library) with tape drives directly connected using Ethernet with no intermediary tape drive controller, reading the physical location has previously not been accomplished without at least requiring inconvenient and/or costly modification to the tape drives.

SUMMARY

The present invention is directed toward a method for associating a physical address with a logical communication address for an Ethernet-connected media drive in a media library assembly. In one embodiment, the method includes the steps of providing a first media drive having a first physical address; sending a request for a first logical communication address from the first media drive to a library controller via an Ethernet switch, the first physical address being imbedded in the request; and recording the first physical address with the Ethernet switch.

In another embodiment, the method further includes the step of associating the first physical address with one of a plurality of Ethernet switch ports using the library controller. In one embodiment, the step of associating includes using a mapping server of the library controller. Further, the step of associating can include searching a routing table of the Ethernet switch with the library controller to determine the first physical address.

In another embodiment, the method further includes the step of assigning the first logical communication address to the first physical address with the library controller. In one embodiment, the step of assigning can include basing the first logical communication address on an Ethernet switch port that is associated with the first physical address. In certain embodiments, the step of providing includes the first physical address being a Media Access Control (MAC) address. In another embodiment, the first logical communication address includes an Internet Protocol (IP) address. In certain embodiments, the step of recording includes storing the first physical address of the first media drive within the routing table of the Ethernet switch. Further, the step of recording can include storing a plurality of physical addresses of a plurality of corresponding media drives within the routing table of the Ethernet switch. The step of recording can include associating the plurality of physical addresses each with a corresponding Ethernet switch port using the library controller.

In one embodiment, the media drive can include a tape drive, while the media library assembly can include a tape library.

BRIEF DESCRIPTION OF THE DRAWINGS

The invention, together with further advantages thereof may best be understood by reference to the following description taken in conjunction with the accompanying drawings, taken in conjunction with the accompanying description, in which similar reference characters refer to similar parts, and in which:

FIG. 2A is an example of a routing table used by the Ethernet switch showing a listing of switch ports and an associated physical address for one switch port;

FIG. 2B is the routing table illustrated in FIG. 2A, showing a listing of switch ports and the associated physical addresses for all switch ports.

DESCRIPTION

Figure 1:
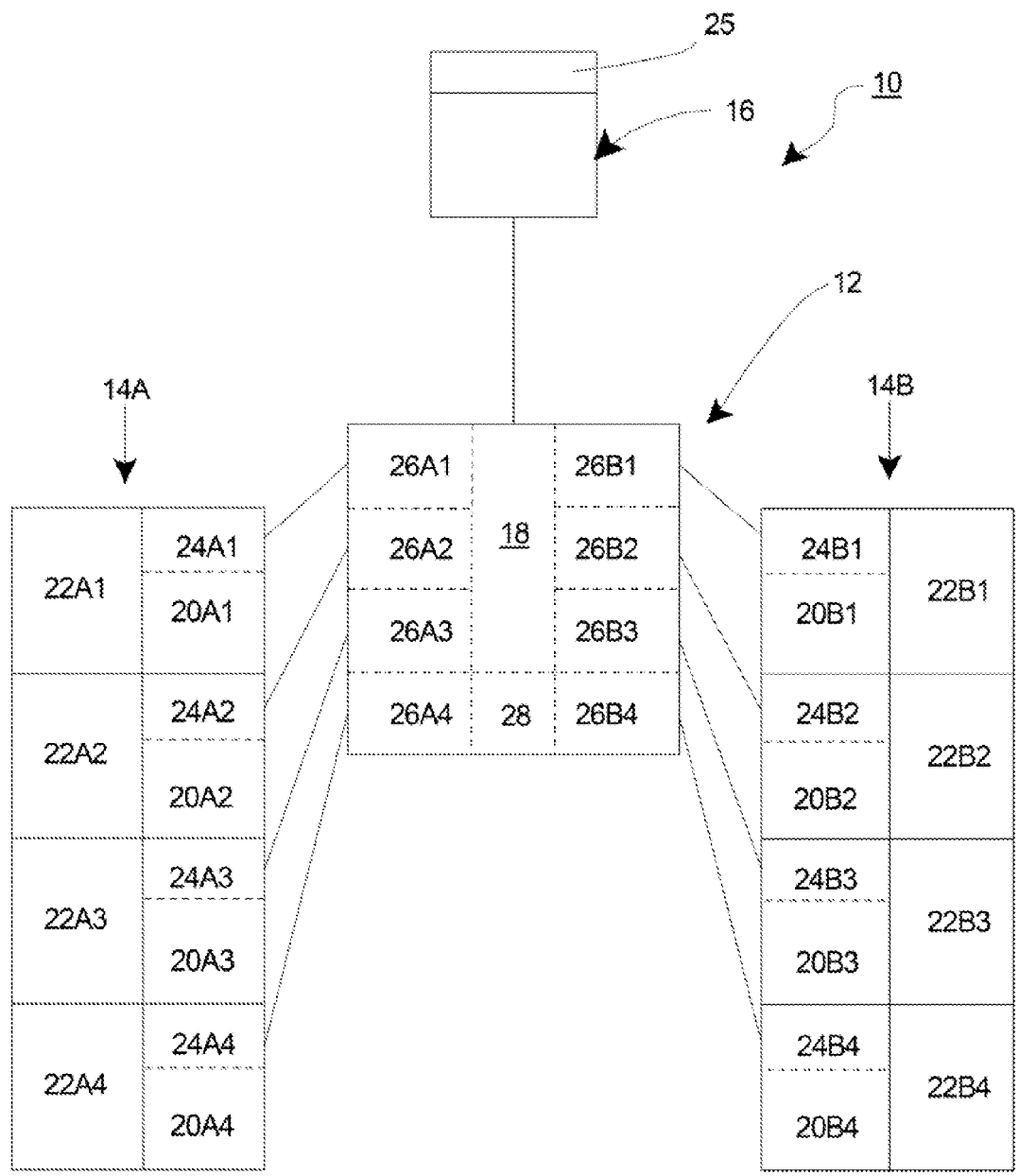
FIG. 1 is a schematic block diagram of one embodiment of a media library assembly having features of the present invention including a library controller and a plurality of Ethernet-connected media drives, and an Ethernet switch.

FIG. 1 is a schematic block diagram of a media library assembly 10 including one or more media libraries 12. For ease of description, the media library assembly 10 illustrated in FIG. 1 includes a single media library 12. However, it is understood that the media library assembly 10 can include any suitable number of media libraries 12 that are communicatively connected to one another. Additionally, the media library assembly 10 described herein is particularly suited to media that include magnetic storage tapes used in Ethernet-connected devices, as provided below. However, this reference to magnetic storage tapes is not intended to limit the invention in any manner. It is understood that media libraries using different types of Ethernet-connected media drives can be utilized with the present invention, such as virtual tape drives, optical drives and magneto-optical drives, as non-exclusive examples.

In the case of multiple media libraries 12 within the media library assembly 10, the relative location of the media libraries 12 can be varied. For example, the media libraries 12 can all be located in one on-site, central location, such as a single storage room or data storage facility. Alternatively, one or more of the media libraries 12 can be located in a separate room from one or more of the other media libraries 12. Still alternatively, one or more of the media libraries 12 can be located off-site in a completely separate structure. In yet another embodiment, one or more media libraries 12 can be located in another state, province or country, or on another continent from one or more of the remaining media libraries 12.

The media library assembly 10 can also include a plurality of library communication links (not shown) that allow communication between the media libraries 12. The library communication links between the media libraries 12 can be varied, and can include one or more different types of library communication links within the media library assembly 10, as generally known by those skilled in the art.

In the embodiment illustrated in FIG. 1, the media library assembly 10 includes one or more drive modules including a first drive module 14A and a second drive module 14B, one or more library controllers 16, and one or more Ethernet switches 18. Although two drive modules 14A, 14B are illustrated in FIG. 1, it is recognized that any suitable number of drive modules can be included in the media library assembly 10. The first drive module 14A can include a plurality of first drive bays 20A1-20A4. The second drive module 14B can include a plurality of second drive bays 20B1-20B4. Each drive bay 20A1-20A4, 20B1-20B4 can receive a corresponding pluggable media drive 22A1-22A4, 22B1-22B4. In one embodiment, any media drive 22A1-22A4, 22B1-22B4 can plug into any drive bay 20A1-20A4, 20B1-20B4 in any drive module 14A, 14B. It is recognized that although four drive bays 20A1-20A4, 20B1-20B4 and media drives 22A1-22A4, 22B1-22B4 are included in each drive module 14A, 14B, the number of drive bays 20A1-20A4, 20B1-20B4 and corresponding media drives 22A1-22A4, 22B1-22B4 in each drive module 14A, 14B can vary to suit the design requirements of the media library assembly 10.

Each media drive 22A1-22A4, 22B1-22B4 can read data from and/or write data to one or more storage media (not shown). In one embodiment, one or more of the media drives 22A1-22A4, 22B1-22B4 is an Ethernet-connected media drive. For example, in one embodiment, all of the media drives 22A1-22A4, 22B1-22B4 can be Ethernet-connected media drives. Further, one or more of the media drives 22A1-22A4, 22B1-22B4 includes a tape drive that receives a tape cartridge, such as DLT™ tape media, LTO Ultrium™ media, DAT/DDS media, Travan™ media, SDLT™ tape media, etc., manufactured and sold by Quantum Corporation, as non-exclusive examples. In non-exclusive alternative embodiments, one or more of the media drives 22A1-22A4, 22B1-22B4 can include a drive for a different type of storage media, such as optical, magneto-optical, hard disk, virtual tape, or any other suitable type of storage media. Additionally, in certain embodiments, each drive bay 20A1-20A4, 20B1-20B4 includes a corresponding Ethernet bay port 24A1-24A4, 24B1-24B4 (sometimes referred to herein simply as a "bay port").

In one embodiment, the library controller 16 can include a standard programmable general purpose computer formed on a single plug-in card unit. The library controller 16 can include a programmed microprocessor or microcontroller according to the present invention, memory, communication interface, control interface, connectors, etc. In certain embodiments, the library controller 16 can utilize a mapping server 25, such as a Dynamic Host Configuration Protocol (DHCP) server, to assign Internet Protocol (IP) addresses to each media drive 22A1-22A4, 22B1-22B4 in the media library assembly 10, as described in greater detail below. The mapping server 25 supervises and distributes logical communication addresses from the library controller 16 and automatically sends a new logical communication address when a media drive 221-22A4, 22B1-22B4 is plugged into a different drive bay 20A1-20A4, 20B1-20B4 in the media library assembly 10.

The Ethernet switch 18 is used to connect one, some or all of the media drives 22A1-22A4, 22B1-22B4 with the library controller 16 and/or with one another. The Ethernet switch 18 can receive and/or inspect a data packet before transmitting the data packet to the library controller 16 or to one of the media drives 22A1-22A4, 22B1-22B4. In the embodiment illustrated in FIG. 1, the Ethernet switch 18 includes a plurality of Ethernet switch ports 26A1-26A4, 26B1-26B4 (sometimes referred to herein simply as a "switch port"). The Ethernet switch includes a routing table 28 that records certain physical address information from the media drives 22A1-22A4, 22B1-22B4, as described in greater detail below.

In one embodiment, the tape library assembly 10 is designed to connect the bay port 24A1-24A4, 24B1-24B4 to the corresponding switch port 26A1-26A4, 26B1-26B4. More specifically, bay port 24A1 is connected to switch port 26A1, bay port 24A2 is connected to switch port 26A2, bay port 24A3 is connected to switch port 26A3, etc. With this design, an Ethernet message arriving on a given switch port 26A1-26A4, 26B1-26B4 is known to have originated from a specific and corresponding drive bay 20A1-20A4, 20B1-20B4 in the media library assembly 10.

In certain embodiments, during initialization of the Ethernet network to use TCP/IP protocol, the media drive 22A1-22A4, 22B1-22B4 located in a given drive bay 20A1-20A4, 20B1-20B4 in a given drive module 14A, 14B can send out a request for a logical communication address, e.g., an IP address, to the mapping server 25 running on the library controller 16. A function of the mapping server 25 is to associate a physical address, e.g., a Media Access Control (MAC) address, with the particular logical communication address. When the media drive 22A1-22A4, 22B1-22B4 sends out the request for the logical communication address, the message has the physical address imbedded in the request. It is understood that during manufacture, the media drive 22A1-22A4, 22B1-22B4 is assigned a unique physical address. As the logical communication address request message passes through the Ethernet switch 18 to the library controller 16, the Ethernet switch records the physical address of the request message in the routing table 28. In various embodiments, the routing table 28 includes a list of switch ports 26A1-26A4, 26B1-26B4 and associated physical addresses, such as MAC addresses, for example.

FIG. 2A is an example of a routing table 228 that is stored in the Ethernet switch 18 after one media drive 22A1 (illustrated in FIG. 1) has sent out a request for a logical communication address. In this example, the message has the physical address imbedded in the request. As the logical communication address request message passes through the Ethernet switch 18 (illustrated in FIG. 1) to the library controller 16 (illustrated in FIG. 1), the Ethernet switch 18 records the physical address of the request message in the routing table 228, as illustrated in FIG. 2A. In the embodiment illustrated in FIG. 2A, the physical address that is imbedded in the request from media drive 22A1 is "00-B0-D0-E4-77-D1", and is associated with switch port 26A1 (illustrated in FIG. 1) because media drive 22A1 is connected to switch port 26A1.

In one embodiment, if media drive 22A1 were unplugged from drive bay 20A1, and another media drive 22B4 were plugged into drive bay 20A1, a request would then be made to the mapping server 25 for a logical communication address. However, in this embodiment, the mapping server 25 of the library controller 16 would see from the routing table that the requests from media drives 22A1 and 22B4 both originated from drive bay 20A1 which is associated with switch port 26A1. Therefore, rather than assign a new logical communication address to media drive 22B4, the mapping server 25 of the library controller 16 would assign the same logical communication address to media drive 22B4 as previously installed media drive 22A1 since both media drives 22A1, 22B4 occupied the same drive bay 20A1 (albeit at different times).

FIG. 2B is the routing table 228 illustrated in FIG. 2A once all media drives 22A1-22A4, 22B1-22B4 (illustrated in FIG. 1) have sent out requests for a logical communication addresses. Each message has the physical address imbedded in the request. As the logical communication address request messages pass through the Ethernet switch 18 (illustrated in FIG. 1) to the library controller 16 (illustrated in FIG. 1), the Ethernet switch 18 records the physical addresses of the request messages in the routing table 228, as illustrated in FIG. 2B. In this embodiment, each physical address is associated with a corresponding switch port 26A1-26A4, 26B1-26B4, as shown in FIG. 2B.

In one embodiment, after the request message passes through the Ethernet switch 18, and before the mapping server 25 assigns a logical communication address, the library controller 16 can read the routing table 28 to determine the physical address from the logical communication address request message. The library controller 16 can then search the routing table 28 for the physical address found in the logical communication address request message. Once the physical address is found in the routing table 28, the associated switch port 26A1-26A4, 26B1-26B4 is determined. At this point, the library controller 16 has the mapping between the physical address of the media drive 22A1-22A4, 22B1-22B4 and the associated switch port 26A1-26A4, 26B1-26B4 to which the media drive 22A1-22A4, 22B1-22B4 is connected.

The mapping server 25 assigns a logical communication address to the associated physical address received on a given switch port 26A1-26A4, 26B1-26B4 in a systematic, predetermined manner. For example, a logical communication address request coming from drive bay 22A1 in the first drive module 14A flows through switch port 26A1 of the Ethernet switch 18, and would be assigned logical communication address 10.10.10.1. A logical communication address request from drive bay 22A2 in the first drive module 14A flows through switch port 26A2 of the Ethernet switch 18, and would be assigned logical communication address 10.10.10.2. Somewhat similarly, logical communication address requests from drive bays 22A3 and 22A4 in the first drive module 14A would be assigned logical communication addresses 10.10.10.3 and 10.10.10.4, respectively. Further, logical communication address requests from drive bays 22B1-22B4 in the second drive module 14B would be assigned logical communication addresses 10.10.20.1 through 10.10.20.4, respectively.

As the mapping server 25 receives a logical communication address request, a logical communication address is assigned to the physical address in the request message based upon the switch port 26A1-26A4, 26B1-26B4 on which the request was received.

With this design, the library controller 16 has accurate mapping of the logical communication addresses with the physical addresses. When the library controller 16 requests a status from a media drive 22A1-22A4, 22B1-22B4 at a certain physical location, the correct media drive 22A1-22A4, 22B1-22B4 will be accessed because logical communication addresses have been duly assigned to physical addresses received on a given switch port 26A1-26A4, 26B1-26B4 and each switch port 26A1-26A4, 26B1-26B4 is associated with the physical location of a specific media drive 22A1-22A4, 22B1-22B4. Thus, the mapping server 25 of the library controller 16 does not just randomly select a logical communication address to be assigned to a particular physical address. Rather, the mapping server 25 consults the routing table 28 first before assigning a logical communication address.

Figure 3:
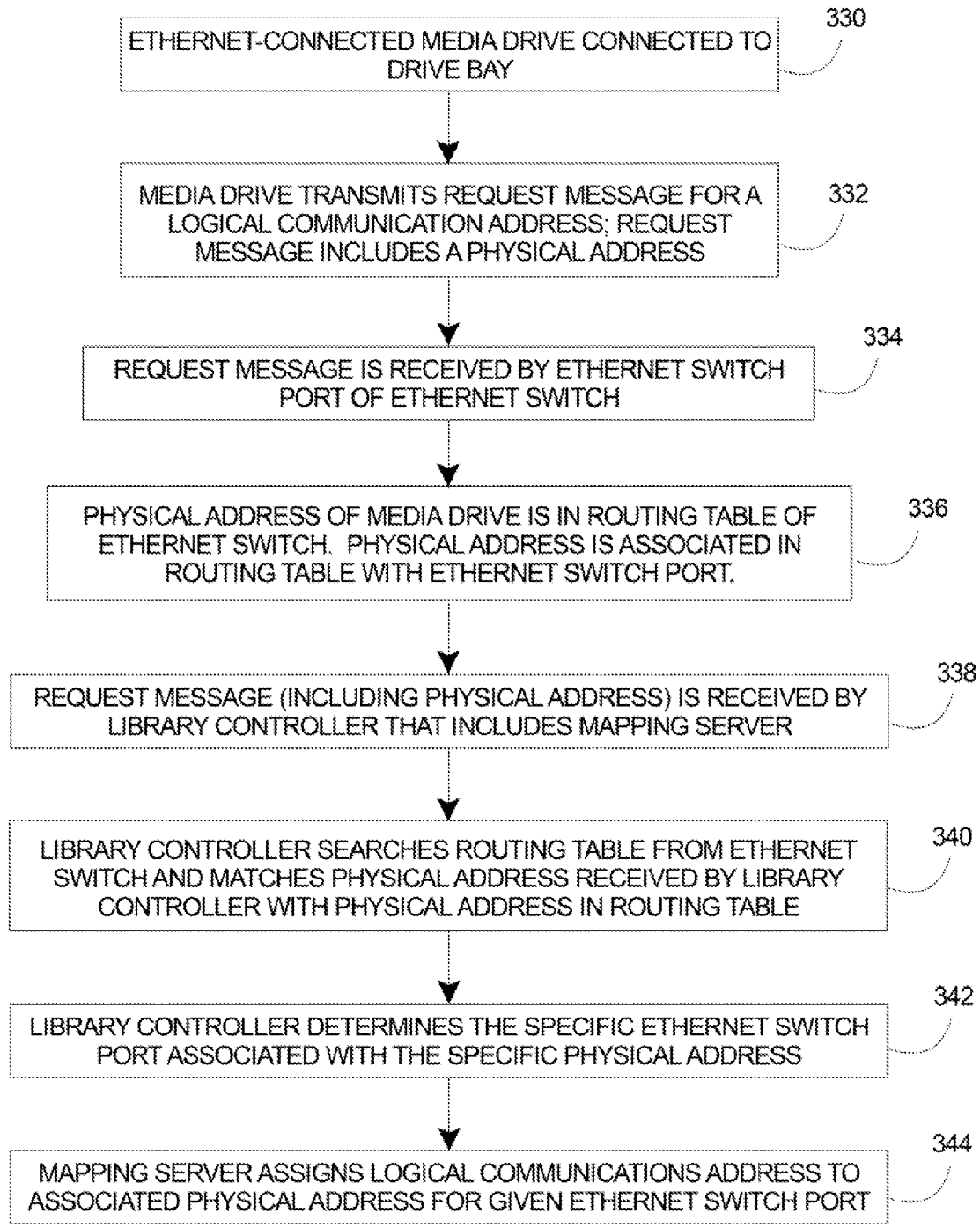
FIG. 3 is a flow chart showing steps of one embodiment of a method for associating a physical address with a logical address for an Ethernet-connected media drive in a media library.

FIG. 3 is a flow chart showing a series of steps for one embodiment of a method for associating a physical address with a logical communication address for one or more Ethernet-connected media drives in a media library assembly.

In this embodiment, at step 330, an Ethernet-connected media drive is plugged into or otherwise connected to a drive bay.

At step 332, during initialization of the Ethernet network to use TCP/IP protocol, for example, the media drive transmits a request message for a logical communication address, such as an IP address. The request message includes the physical address, such as a MAC address, of the media drive.

At step 334, the request message is received by an Ethernet switch port of an Ethernet switch.

At step 336, the physical address of the media drive is recorded in a routing table of the Ethernet switch. The physical address is associated in the routing table with the Ethernet switch port.

At step 338, the request message (including the physical address) is received by a library controller that includes a mapping server, such as a DHCP server.

At step 340, the library controller searches the routing table from the Ethernet switch and matches the physical address received by the library controller with the physical address in the routing table.

At step 342, the library controller determines the Ethernet switch port associated with the physical address.

At step 344, the mapping server assigns a logical communication address to the associated physical address for the given Ethernet switch port.

It is recognized that the embodiment described and illustrated relative to FIG. 3 is provided as a representative example. Other embodiments can be utilized with the present invention which may omit one or more steps described herein, or may add one or more steps that may be obvious to one skilled in the art.

While the particular media library assembly 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method comprising the steps of:
    sending a request from an Ethernet-connected tape drive of a tape library assembly to a library controller via an Ethernet switch to receive a logical communication address that is then associated with a physical address of the tape drive, the physical address being imbedded in the request; and
    recording the physical address in a routing table that is stored in the Ethernet switch.

2. The method of claim 1 further comprising the step of associating the physical address with one of a plurality of Ethernet switch ports using the library controller.

3. The method of claim 2 wherein the step of associating includes using a mapping server of the library controller.

4. The method of claim 2 wherein the step of associating includes searching the routing table with the library controller to determine the physical address.

5. The method of claim 1 further comprising the step of assigning the logical communication address to the physical address using the library controller.

6. The method of claim 5 wherein the step of assigning includes basing the logical communication address on an Ethernet switch port that is associated with the physical address.

7. The method of claim 1 wherein the step of sending includes the physical address being a Media Access Control address.

8. The method of claim 1 wherein the step of sending includes the logical communication address including an Internet Protocol address.

9. The method of claim 1 wherein the step of recording includes storing a plurality of physical addresses of a plurality of corresponding tape drives in the routing table that is stored in the Ethernet switch.

10. The method of claim 9 wherein the step of recording includes associating each of the plurality of physical addresses with a corresponding Ethernet switch port using the library controller.

11. The method of claim 1 wherein the tape drive has been assigned a single, unique physical address.

12. A method comprising the steps of:
sending a first request from a first Ethernet-connected tape drive of a tape library assembly to a library controller via an Ethernet switch to receive a first logical communication address that is then associated with a first physical address of the first tape drive, the first physical address being imbedded in the first request;
sending a second request from a second Ethernet-connected tape drive of the tape library assembly to the library controller via the Ethernet switch to receive a second logical communication address that is then associated with a second physical address of the second tape drive, the second physical address being imbedded in the second request, the second physical address being different than the first physical address; and
recording the first physical address and the second physical address in a routing table that is stored in the Ethernet switch.

13. The method of claim 12 further comprising the steps of (i) associating the first physical address with a first Ethernet switch port using the library controller, and (ii) associating the second physical address with a second Ethernet switch port using the library controller.

14. The method of claim 13 wherein the steps of associating the first physical address and associating the second physical address each includes using a mapping server of the library controller.

15. The method of claim 13 wherein the step of associating the first physical address includes searching the routing table with the library controller to determine the first physical address, and wherein the step of associating the second physical address includes searching the routing table with the library controller to determine the second physical address.

16. The method of claim 12 further comprising the steps of (i) assigning the first logical communication address to the first physical address using the library controller, and (ii) assigning the second logical communication address to the second physical address using the library controller.

17. The method of claim 16 wherein the step of assigning the first logical communication address includes basing the first logical communication address on a first Ethernet switch port that is associated with the first physical address; and wherein the step of assigning the second logical communication address includes basing the second logical communication address on a second Ethernet switch port that is associated with the second physical address.

18. The method of claim 12 wherein the step of sending the first request includes the first physical address being a Media Access Control address.

19. The method of claim 12 wherein the step of sending the first request includes the first logical communication address including an Internet Protocol address.

20. The method of claim 12 wherein the first tape drive has been assigned a single, unique first physical address, and wherein the second tape drive has been assigned a single, unique second physical address.

21. A method comprising the steps of:
sending a first request from a first Ethernet-connected tape drive of a tape library assembly to a library controller via an Ethernet switch to receive a first logical communication address, the first tape drive having been assigned a single, unique first physical address that is imbedded in the first request, the first logical communication address then being associated with the first physical address of the first tape drive;
recording the first physical address in a routing table that is stored in the Ethernet switch;
associating the first physical address with a first Ethernet switch port using the library controller;
assigning the first logical communication address to the first physical address using the library controller based on the first Ethernet switch port that is associated with the first physical address.

22. The method of claim 21 further comprising the steps of:
sending a second request from a second Ethernet-connected tape drive of the tape library assembly to the library controller via the Ethernet switch to receive a second logical communication address, the second tape drive having been assigned a single, unique second physical address that is imbedded in the second request, the second logical communication address then being associated with the second physical address of the second tape drive, the second physical address being different than the first physical address;
recording the second physical address in the routing table that is stored in the Ethernet switch;
associating the second physical address with a second Ethernet switch port using the library controller;
assigning the second logical communication address to the second physical address using the library controller based on the second Ethernet switch port that is associated with the second physical address.

* * * * *